United States Patent
Shinkai et al.

(10) Patent No.: US 8,077,229 B2
(45) Date of Patent: Dec. 13, 2011

(54) IMAGE PARAMETER CORRECTION FOR PICKED-UP IMAGE AND SIMULATED IMAGE

(75) Inventors: Mitsutoshi Shinkai, Kanagawa (JP); Kazuo Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/170,745

(22) Filed: Jul. 10, 2008

(65) Prior Publication Data
US 2009/0015687 A1    Jan. 15, 2009

(30) Foreign Application Priority Data

Jul. 12, 2007    (JP) ................... P2007-182824

(51) Int. Cl.
*H04N 5/76*    (2006.01)
*H04N 5/202*    (2006.01)
*H04N 5/222*    (2006.01)

(52) U.S. Cl. .................. 348/254; 348/231.6; 348/333.12

(58) Field of Classification Search ............... 348/231.3, 348/231.6, 254, 333.11, 333.12
See application file for complete search history.

(56) References Cited

U.S. PATENT DOCUMENTS

| | | | |
|---|---|---|---|
| 6,650,365 B1 * | 11/2003 | Sato | 348/231.3 |
| 6,995,793 B1 * | 2/2006 | Albadawi et al. | 348/239 |
| 7,190,401 B2 * | 3/2007 | Hara et al. | 348/333.02 |
| 7,463,295 B2 * | 12/2008 | Asada et al. | 348/254 |
| 7,656,451 B2 * | 2/2010 | Yanagi | 348/333.11 |
| 2003/0174228 A1 * | 9/2003 | Brake et al. | 348/333.11 |
| 2003/0193602 A1 * | 10/2003 | Satoh et al. | 348/333.12 |
| 2004/0004665 A1 | 1/2004 | Kashiwa | |
| 2005/0134711 A1 * | 6/2005 | Hori | 348/254 |
| 2005/0275732 A1 * | 12/2005 | Takeuchi | 348/231.99 |
| 2006/0221199 A1 * | 10/2006 | Nakajima | 348/222.1 |
| 2007/0024735 A1 * | 2/2007 | Yoneda et al. | 348/333.12 |
| 2007/0031117 A1 | 2/2007 | Abe | |
| 2007/0206121 A1 * | 9/2007 | Yoshida | 348/630 |
| 2009/0256935 A1 * | 10/2009 | Endo et al. | 348/254 |
| 2009/0256947 A1 * | 10/2009 | Ciurea et al. | 348/333.12 |
| 2010/0066861 A1 * | 3/2010 | Sakagami | 348/231.6 |
| 2010/0177215 A1 * | 7/2010 | Kita | 348/234 |
| 2010/0194963 A1 * | 8/2010 | Terashima | 348/333.11 |

FOREIGN PATENT DOCUMENTS

| | | | |
|---|---|---|---|
| JP | 2000-138862 | | 5/2000 |
| JP | 2001251635 A | * | 9/2001 |
| JP | 2002-374417 | | 12/2002 |
| JP | 2004 32277 | | 1/2004 |
| JP | 2004-328098 | | 11/2004 |
| JP | 2007 43372 | | 2/2007 |
| JP | 2007 43373 | | 2/2007 |

OTHER PUBLICATIONS

Translation of JP 2000-138862 A.*

* cited by examiner

*Primary Examiner* — John Villecco
(74) *Attorney, Agent, or Firm* — Frommer Lawrence & Haug LLP; William S. Frommer

(57) ABSTRACT

Disclosed herein is an imaging apparatus for performing predetermined image signal processing on an image signal picked up by an image pickup device in order to convert the image signal for recording and display purposes, the imaging apparatus including, a parameter storage section, a parameter setting section, a gamma correction processing section, and a display-ready signal conversion section.

8 Claims, 9 Drawing Sheets

| byte No | 0 | 1 | 2 | 3 | 4 | 5 | 6 | 7 | 8 | 9 | A | B | C |
|---|---|---|---|---|---|---|---|---|---|---|---|---|---|
| Date | 0 | 0 | 9 | 5 | 1 | 1 | 5 | 5 | 0 | 1 | 1 | 0 | 0 |

GAIN(+0.95)  LIFT(−1.55)  POWER(1.10)  ORDER OF GLP

IMAGE PARAMETER CORRECTION FOR PICKED-UP IMAGE AND SIMULATED IMAGE

CROSS REFERENCE TO RELATED APPLICATIONS

The present invention contains subject matter related to Japanese Patent Application JP 2007-182824 filed in the Japan Patent Office on Jul. 12, 2007, the entire contents of which being incorporated herein by reference.

BACKGROUND OF THE INVENTION

1. Field of the Invention

The present invention relates to an imaging apparatus, an imaging method, and an image signal processing program. More particularly, the invention relates to an imaging apparatus and an imaging method for performing predetermined image signal processing on the image signal picked up by an image pickup device so as to convert the signal for recording and display purposes, as well as an image signal processing program for use with the imaging apparatus and imaging method.

2. Description of the Related Art

At the time of producing an image content constituted by a combination of various scenes containing imaged materials, a number of processes are carried out successively: planning to image the scenes making up the content, picking up images of the individual scenes, and editing the raw images into content. Some systems, such as one disclosed by Japanese Patent laid-open No. 2007-43373 (paragraphs [0076] through [0113], FIGS. 14 through 16), have been proposed to support the content production by allowing these processes to be effected efficiently.

According to the content production system disclosed by the above-cited Patent Document 1, the planning process involves preparing imaging support information and outputting the prepared information to an external recording medium so that the information may be referenced from there during the execution of imaging. In the imaging process, an imaging apparatus is used to pick up images in accordance with the imaging support information. The editing process involves diversely editing the raw images into a suitably organized content. The process following the imaging process is called the post-production process or post-processing. The edited images are stored in a database for management together with editing information including the imaging support information, raw images, and correction parameters used for the editing. The editing information thus stored in the database may be utilized in subsequent content production. Two kinds of correction parameters are used in the post-production process: camera settings established upon imaging, and effects correction values for image adjustment. The camera settings for use upon imaging include the values for setting camera functions such as exposure, white balance, gamma correction, and color adjustment. The effects correction values are used to correct the raw images in order to attain desired image quality. The effects correction values include the values for adjusting the attributes of image effects such as exposure, white balance, gamma correction, 3-D effects, trimming, and zooming. The post-production process involves the use of the correction parameters set by the user through an operation input device as well as the correction parameters set in the editing information stored previously in the database.

SUMMARY OF THE INVENTION

In the past content production process, the parameters for effects correction were set in the post-production process following the imaging process. That means it was impossible to check the processed images at the timing of imaging. In the case of the content production apparatus disclosed by the above-cited Patent Document 1, correction parameters are managed by an information processing apparatus used for editing and are not reported to the imaging apparatus.

However, the need has long been felt for simulating images having undergone post-production processing at the time of imaging. A parameter type called the gamma correction parameter is one of the correction parameters and is used in a toning process for adjusting image contrast. Illustratively, varying the values of this parameter type changes image tone. As such, the gamma correction parameters constitute an important factor in determining the type of image expression the user wants to have in the post-production process subsequent to imaging. In the imaging stage such as at a movie-shooting site, there has been a strong need for verifying the images having supposedly undergone gamma correction in post-production processing.

There exist external devices each connectable to the imaging apparatus so that raw images picked up by the apparatus may be subjected to gamma correction and displayed by the device. However, bringing such devices at an imaging site in addition to the cumbersome imaging apparatus can be troublesome and inconvenient. Furthermore, it is not easy to preserve and utilize subsequently the correction parameters established on the attached device in the field. Even if the correction parameters are somehow output by the added device to an external recording medium, the parameters must be manually associated with the image signals created by the separately established imaging apparatus.

The present invention has been made in view of the above circumstances and provides an imaging apparatus, an imaging method, and an image signal processing program for permitting the simulation of post-production processing at an imaging site so that effects of the processing may be verified in the field.

According to an embodiment of the present invention, there is provided an imaging apparatus for performing predetermined image signal processing on an image signal picked up by an image pickup device in order to convert the image signal for recording and display purposes, the imaging apparatus including:

a parameter storage section configured to store output correction parameters used to output the picked-up image signal to the outside, and simulation correction parameters used in simulation mode subsequent to imaging;

a parameter setting section configured to select the simulation correction parameters if the simulation mode is set based on an externally designated input, and to select the output correction parameters if the simulation mode is canceled, the selected parameters being retrieved from the parameter storage section, the parameter setting section further changing the parameters for gamma correction between the simulation mode and non-simulation mode;

a gamma correction processing section configured to perform gamma correction processing on the input image signal based on either the output correction parameters or the simulation correction parameters set by the parameter setting section; and a display-ready signal conversion section configured to convert into a display-ready signal the image signal having undergone the gamma correction based on the simulation correction parameters when the simulation mode is set.

According to another embodiment of the present invention, there is provided an imaging method for performing predetermined image signal processing on an image signal picked up by an image pickup device in order to convert the image signal for recording and display purposes, the imaging method including the steps of:

storing into a parameter storage section output correction parameters used to output the picked-up image signal to the outside, and simulation correction parameters used in simulation mode subsequent to imaging;

selecting either the simulation correction parameters if the simulation mode is set based on an externally designated input, or the output correction parameters if the simulation mode is canceled, the selected parameters being read from the parameter storage section by the parameter setting section;

changing the parameters for gamma correction between the simulation mode and non-simulation mode;

performing gamma correction processing on the input image signal based on either the output correction parameters or the simulation correction parameters set in the parameter selecting step by the gamma correction processing section; and converting into a display-ready signal the image signal having undergone the gamma correction based on the simulation correction parameters when the simulation mode is set by the display-ready signal converting section.

According to yet another embodiment of the present invention, there is provided an image signal processing program for causing a computer to perform predetermined image signal processing on an image signal picked up by an image pickup device for correction purposes, the image signal processing program including the steps of:

storing into a parameter storage section output correction parameters used to output the picked-up image signal to the outside, and simulation correction parameters used in simulation mode subsequent to imaging;

selecting either the simulation correction parameters if the simulation mode is set based on an externally designated input, or the output correction parameters if the simulation mode is canceled, the selected parameters being retrieved from the parameter storage section by the parameter setting section;

changing the parameters for gamma correction between the simulation mode and non-simulation mode;

performing gamma correction processing on the input image signal based on either the output correction parameters or the simulation correction parameters set in the parameter selecting step by the gamma correction processing section; and converting into a display-ready signal the image signal having undergone the gamma correction based on the simulation correction parameters when the simulation mode is set by the display-ready signal converting sections.

According to an embodiment of the present invention, the output correction parameters for use in ordinary correction are stored along with the simulation correction parameters for use in post-processing (post-production process). In response to an externally designated input, the parameters are changed for gamma correction. If the simulation of post-production processing is set, then gamma correction is performed on the image signal based on the simulation correction parameters, and the corrected image signal is converted into a display-ready signal. When the display-ready signal having undergone the conversion is output on the display device, it is possible to monitor at the imaging stage the images simulating those having undergone the post-production process. If simulation mode is not canceled, then the simulation correction parameters are replaced by the output correction parameters so that the image signal is subjected to ordinary gamma correction.

Where simulation mode is established with the inventive arrangements in use, the parameters for gamma correction are suitably changed to permit simulation of the images to be derived from post-production processing. There is no need for setting up a separate gamma correction processing circuit for simulation purposes or a dedicated device for gamma correction processing. The embodiment of the invention thus makes it easy to monitor the effects of post-production processing at an imaging site.

BRIEF DESCRIPTION OF THE DRAWINGS

FIGS. 7A and 7B are schematic views showing typical metadata;

DETAILED DESCRIPTION OF THE PREFERRED EMBODIMENTS

The preferred embodiments of the present invention will now be described in reference to the accompanying drawings.

Figure 1:
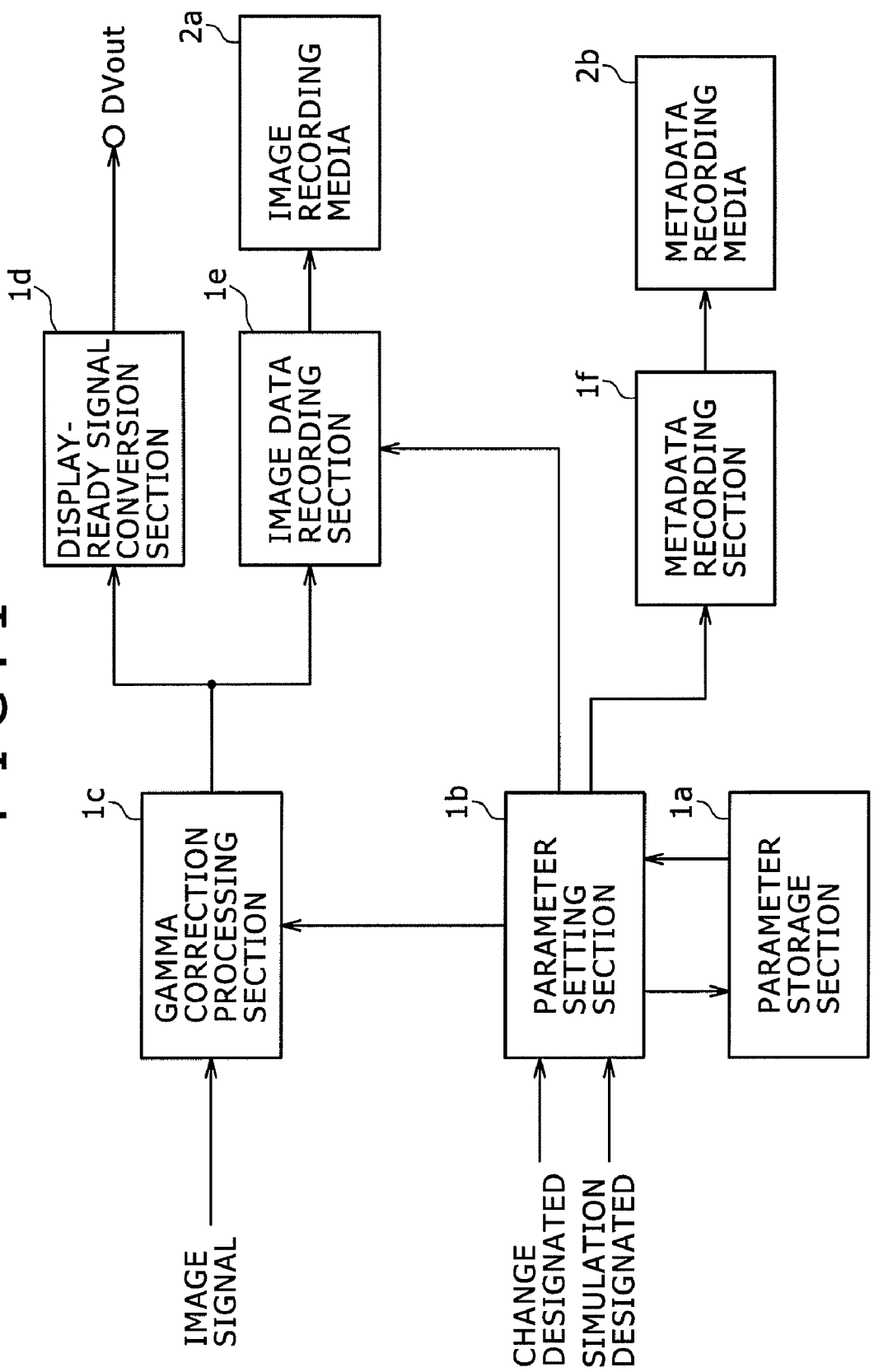
FIG. 1 is a conceptual view of one embodiment of the present invention.

FIG. 1 is a conceptual view of the invention as it is typically embodied. As illustrated, the imaging apparatus according to an embodiment of the present invention includes a parameter storage section 1a configured to store gamma correction parameters, a parameter setting section 1b configured to set the gamma correction parameters for use in processing, a gamma correction processing section 1c configured to perform gamma correction on the image signal, a display-ready signal conversion section 1d configured to convert the corrected image signal into display-ready format, an image data recording section 1e configured to record primarily image signals to image recording media 2a, and a metadata recording section 1f configured to record metadata to metadata recording media 2b. The image signal being input is made up of digital data having undergone analog-to-digital conversion in an upstream stage. The sections outlined above are implemented functionally by a computer executing a suitable image signal processing program.

Normally, the parameter storage section 1a stores two kinds of parameters: the output correction parameters used to record the picked-up image signal to recording media or to output the image signal to the outside through an output terminal; and the simulation correction parameters used to simulate the post-production process subsequent to imaging.

The output correction parameters are mainly set with parameter values for ensuring the dynamic range of images. The simulation correction parameters are set with correction parameter values for toning in the post-production process. In the toning process, the gamma curve and other characteristics are adjusted so as to obtain images of desired tonality. The simulation correction parameters are set primarily with correction values for adjusting mainly the gamma curve characteristic.

Depending on whether the simulation of post-production processing is set or canceled, the parameter setting section 1b changes gamma correction parameters to be set to the gamma correction processing section 1c. Normally, when simulation mode is canceled, the parameter setting section 1b selects the output correction parameters to be stored into the parameter storage section 1a and sets the selected parameters to the gamma correction processing section 1c. If the simulation of post-production processing is set, then the parameter setting section 1b selects the simulation correction parameters to be stored into the parameter storage section 1a and sets the selected parameters to the gamma correction processing section 1c. Normal post-production processing is carried out after gamma correction is performed on the basis of the output correction parameters. For that reason, the simulation correction parameters stored in the parameter storage section 1a are multiplexed with values to be added to the output correction parameters. If the image signal from imaging is targeted for the processing, then the parameter setting section 1b sets the output correction parameters by multiplexing them with the simulation correction parameters. Alternatively, the parameter storage section 1a may be set beforehand with the output correction parameters multiplexed with the simulation correction parameters. As another alternative, the gamma correction processing section 1c may receive the simulation correction parameters targeted for multiplexing and have the received parameters multiplexed on the output correction parameters.

If simulation mode is set and if an instruction is input from the outside to designate a change of correction parameters, then the simulation correction parameters are updated in keeping with the change instruction and the change is reflected in the gamma correction parameters. If a write instruction is given, then the changed simulation correction parameters are stored into the parameter storage section 1a. At this point, the simulation correction parameters are furnished with an ID for identification purposes before being stored.

Based on the gamma correction parameters set by the parameter setting section 1b, the gamma correction processing section 1c performs gamma correction on the input image signal and outputs the corrected image signal. The image signal being input is an image signal picked up by the image pickup device or an image signal recorded to and reproduced from the image recording media 2a. The corrected image signal is output to both the display-ready signal conversion section 1d and the image data recording section 1e. Alternatively, the destination to which to output the corrected image signal may be changed depending on simulation status. That is, the image signal may be output to the display-ready signal conversion section 1d if simulation mode is set and to the image data recording section 1e if simulation mode is canceled.

The display-ready signal conversion section 1d inputs the corrected image signal having undergone gamma correction by the gamma correction processing section 1c, and converts the input signal into a display-ready signal. The display-ready signal is sent illustratively to an externally connected display device through a DVout terminal so that images derived from the display-ready signal may be displayed on the device. Alternatively, the display-ready signal conversion section 1d may continuously create display-ready signals from the corrected image signal being input. As another alternative, the display-ready signal conversion section 1d may create the display-ready signal only when so instructed, such as in simulation mode.

From the gamma correction processing section 1c, the image data recording section 1e acquires the image signal corrected in accordance with the gamma correction parameters to be output. The image data recording section 1e may compress the image signal if necessary before writing it to the image recording media 2a together with metadata. The metadata is constituted by processing information indicating what kind of processing was carried out by the gamma correction processing section 1c. Typically, the processing information is made up of the output correction parameters that were applied. If the gamma correction parameters for simulation used in the simulation of post-production processing are to be utilized in a subsequent post-production process, then the image data recording section 1e records as metadata either the designated gamma correction parameters for simulation or information for identifying these gamma correction parameters for simulation. In the description that follows, the metadata recorded to the image recording media 2a along with image signal data will be referred to as recording metadata.

The metadata recording section 1f records the simulation correction parameters acquired through the parameter setting section 1b and the ID attached to these simulation correction parameters to the metadata recording media 2b as the metadata regarding the image signal. In the ensuing description, the metadata including the simulation correction parameters recorded to the metadata recording media 2b will be referred as post-production metadata, to be distinguished from the recording metadata. The ID attached to each simulation correction parameter doubles as the ID for identifying the post-production metadata. As with image data, the post-production metadata may be output to the outside through a communication device or the like.

Described below are the typical workings of the imaging apparatus of the above-described structure and the imaging method for use therewith. In the description that follows, the state in which simulation is established will be referred as simulation mode and the state in which simulation is canceled as recording mode.

The parameter storage section 1a holds the output correction parameters used in recording mode and the simulation correction parameters for use in simulation mode. The stored information is updated by the parameter setting section 1b in keeping with change instructions designated from the outside.

Normally (i.e., in recording mode), the image signal having been picked up is subjected to gamma correction processing for securing a dynamic range before being recorded to the image recording media 2a. The corrected image data may be output alternatively to the outside through a communication device or the like.

In recording mode, the parameter setting section 1b reads the output correction parameters from the parameter storage section 1a and sets the retrieved parameters to the gamma correction processing section 1c. The gamma correction processing section 1c performs gamma correction on the input image signal based on the output correction parameters and outputs the corrected image signal. The image data recording section 1e compresses the corrected image signal as needed and writes the compressed signal to the image recording media 2a together with the recording metadata acquired through the parameter setting section 1b. When the signal is output from the image recording media 2a to the outside through the communication device, the signal is furnished with the corresponding recording metadata.

As described, the image recording media 2a accommodate the image signal having undergone the gamma correction performed to secure the dynamic range of the picked-up image signal, the already utilized output correction parameters or their ID, and the simulation correction parameters or their ID to be referenced in post-production processing. If correction processing is performed additionally on any parameter other than the gamma correction parameters, then the metadata about the correction parameter in question is also recorded to the image recording media 2a.

In simulation mode, the parameter setting section 1b switches to the simulation correction parameters as the gamma correction parameters to be set to the gamma correction processing section 1c. If the values set in the simulation correction parameters correspond to those multiplexed on the output correction parameters, then the output correction parameters are multiplexed with the retrieved simulation correction parameters before the resulting values are set to the gamma correction processing section 1c. The gamma correction processing section 1c performs gamma correction on the image signal based on the simulation correction parameters set by the parameter setting section 1b. The image signal thus corrected is output to both the display-ready signal conversion section 1d and the image data recording section 1e. The image data recording section 1e does not perform recording because simulation mode is in effect. Alternatively, the corrected image signal may be output only to the display-ready signal conversion section 1d. The display-ready signal conversion section 1d acquires the image signal having undergone gamma correction based on the simulation correction parameters (i.e., image signal simulating the post-production process), converts the acquired signal into a display-ready signal, and outputs the display-ready signal to an externally attached display device through the DVout terminal. Having the display-ready signal displayed on the display device permits monitoring of an actual image to be provided by post-production processing. The display device may be part of the imaging apparatus. If the simulation correction parameters set to the gamma correction processing section 1c as per the change instruction are changed, then the changed simulation correction parameters are used by the gamma correction processing section 1c so that the image derived from the changed parameters will be displayed on the display device. After these adjustments, the ultimately acquired simulation correction parameters may be stored into the parameter storage section 1a through the parameter setting section 1b as the new simulation correction parameters. The newly stored simulation correction parameters are furnished with an ID. If recording is requested, these simulation correction parameters may be recorded to the metadata recording media 2b by the metadata recording section 1f. In that case, the metadata recording media 2b accommodate the simulation correction parameters and their ID as the metadata.

In the manner described above, the gamma correction parameters can be changed depending on the mode in effect; the gamma correction parameters for output use are selected in recording mode, and the gamma correction parameters for simulation purposes are selected in simulation mode. In simulation mode, the image signal subjected to gamma correction based on the gamma correction parameters for simulation is converted into a display-ready signal that may be displayed for verification of the image. In recording mode, the image signal having undergone gamma correction based on the gamma correction parameters for output may be recorded to the image data recording media along with the gamma correction parameters or their ID for simulation purposes, the parameters having been selected as the metadata. With these arrangements implemented, there is no need to set up additional equipment at an imaging site when the images simulating those to be acquired through post-production processing are desired to be verified on the spot. It is also possible to transfer the established gamma correction parameters for simulation purposes to a subsequent post-production process together with the image signal being recorded. This makes it possible to enhance the efficiency of the imaging process and post-production process.

The embodiment above of the present invention will now be explained in detail with reference to the accompanying drawings.

Figure 2:
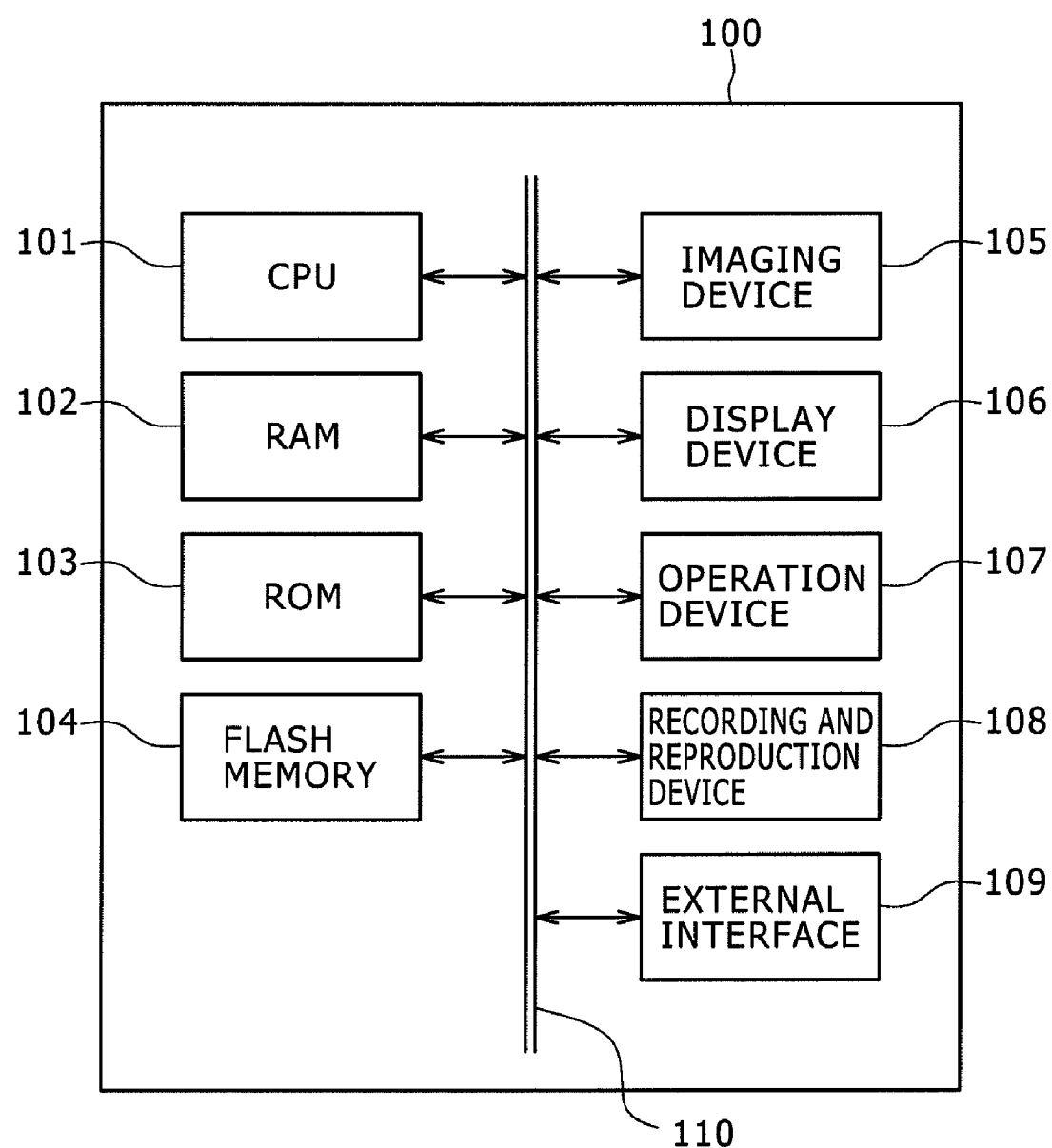
FIG. 2 is a block diagram showing a typical hardware structure of an imaging apparatus practiced as one embodiment of the present invention.

FIG. 2 is a block diagram showing a typical hardware structure embodying the present invention. The imaging apparatus 100 as a whole is controlled by a CPU (central processing unit) 101. Through a bus 110, the CPU 101 is connected with a RAM (random access memory) 102, a ROM (read only memory) 103, a flash memory 104, an imaging device 105, a display device 106, an operation device 107, a recording and reproduction device 108, and an external interface (I/F) 109.

The RAM 102 temporarily retains at least part of the OS (operating system) and application programs to be carried out by the CPU 101. The RAM 102 accommodates various data needed by the CPU 101 in performing its processing. The ROM 103 holds the OS and application programs. The flash memory 104 retains various parameters and data that need to be kept intact when power is removed. The imaging device 105 includes an image pickup device, a drive circuit for driving the pickup device, and an A/D conversion circuit for converting picked-up analog signals into digital form. In operation, the imaging device 105 creates an image signal of the object being imaged. The display device 106 displays entered information such as gamma correction parameters under instructions from the CPU 101. The operation section 107 admits operation input signals entered through a keyboard, buttons and switches, and sends the input signals to the CPU 101 via the bus 110. Under control of the CPU 101, the recording and reproduction device 108 writes data to external recording media such as the image recording media 2a or metadata recording media 2b, reads data from the external recording media, and transfers the retrieved data to the CPU 101 through the bus 110. The external interface 109 is connected to a peripheral device such as a display device and exchanges data with the connected device under control of the CPU 101.

The hardware structure described above is used to implement processing functions of the embodiment.

Figure 3:
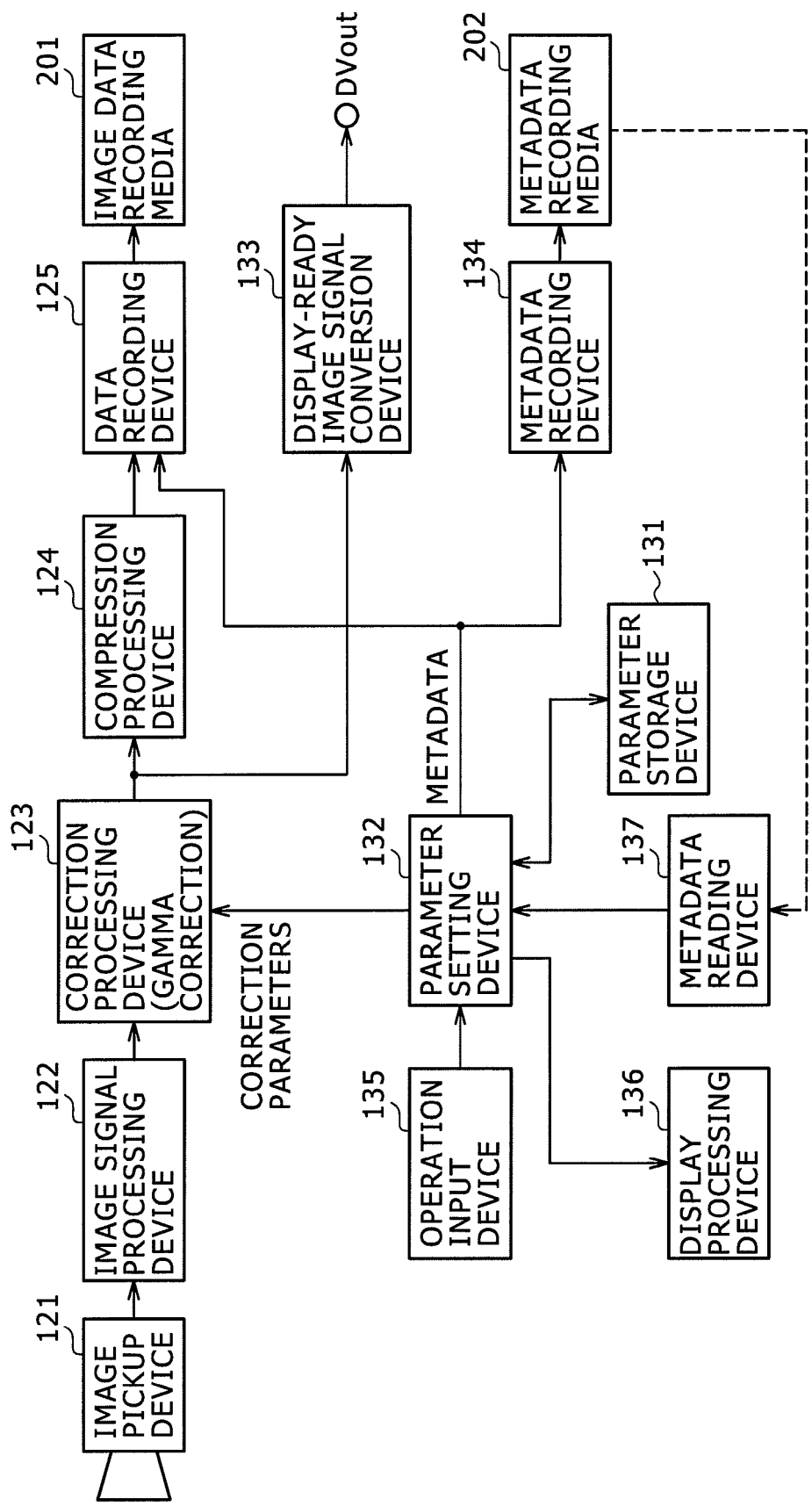
FIG. 3 is a functional block diagram showing processing functions of the imaging apparatus.

FIG. 3 is a functional block diagram showing such processing functions of the imaging apparatus embodying the invention.

The imaging apparatus includes an image pickup device 121, an image signal processing device 122, a correction processing device (gamma correction) 123, a compression processing device 124, a data recording device 125, a parameter storage device 131, a parameter setting device 132, a display-ready signal conversion device 133, a metadata recording device 134, an operation input device 135, a display processing device 136, and a metadata reading device 137. The processes carried out by these component devices are implemented in practice by the CPU 101 executing the image signal processing program stored in the ROM 103.

The image pickup device 121 constituting the imaging device 105 is a CMOS (complementary metal oxide semiconductor) or CCD (change coupled device) arrangement that creates an image signal of the object being imaged. The image signal processing device 122 receives the image signal in analog form, removes noises from the received image signal, and converts the signal into digital form. The correction processing device 123 inputs the image signal that was converted into digital form by the image signal processing device 122, and subjects the input image signal to such correction processes as toning, nonlinear processing, and edge enhancement. Gamma correction, one form of the nonlinear processing, involves compressing the picked-up image signal into an appropriate dynamic range based on the output correction parameters in effect when simulation is not set. If the simulation of post-production processing is set, then the correction processing device 123 performs gamma correction with a view to simulating the post-production process based on the simulation correction parameters established by the parameter setting device 132. The image signal thus corrected is output to both the compression processing device 124 and the display-ready signal conversion device 133. Alternatively, the corrected image signal may be selectively output either to the display-ready signal conversion device 133 if simulation mode is set, or to the compression processing device 124 if simulation mode is not in effect. The compression processing device 124 compresses the image signal in order to reduce the amount of the data making up the image signal in digital form. The data recording device 125 records to the image data recording media 201 the image signal and recording metadata following compression by the compression processing device 124.

The parameter storage device 131 holds two kinds of parameters: the output correction parameters for securing a dynamic range, and the simulation correction parameters for correcting images effectively. The parameter storage device 131 is provided illustratively in the flash memory 104. The parameters stored in the parameter storage device 131 are updated by the parameter setting device 132 in keeping with the instructions input from the operation input device 135. Depending on the mode in effect, the parameter setting device 132 sets the gamma correction parameters for use in gamma correction by the correction processing device 123. In simulation mode, the parameter setting device 132 selects the simulation correction parameters, reads the selected parameters from the parameter storage device 131, and sets the retrieved parameters. In recording mode, the parameter setting device 132 selects the output correction parameters, reads the selected parameters from the parameter storage device 131, and sets the retrieved parameters. Also in recording mode, the parameter setting device 132 outputs recording metadata to the data recording device 125. In simulation mode, the display-ready signal conversion device 133 acquires the image signal corrected by the correction processing device 123 based on the simulation correction parameters, converts the acquired image signal into a display-ready image signal, and outputs the display-ready signal to the outside through the DVout terminal. The metadata recording device 134 records to the metadata recording media 202 the post-production metadata regarding the gamma correction parameters for simulation purposes when so requested. The post-production metadata may be acquired from the parameter setting device 132 or may be read directly from the parameter storage device 131 by the metadata recording device 134. The operation input device 135 converts what was designated by the user operating the operation device 107 into information and sends this information to the parameter setting device 132. The information transferred to the parameter setting device 132 includes settings specifying whether simulation mode is set, and any change of values in the gamma correction parameters. Under instructions from the parameter setting device 132, the display processing device 136 displays information such as the currently established correction parameters, related metadata, and change operation status. The metadata reading device 137 causes the recording and reproduction device 108 to read the metadata which was set beforehand typically by post-production equipment and which is recorded on the metadata recording media 202. The metadata may alternatively be the data written to the metadata recording media 202 by the own apparatus prior to upstream processing. In this case, the metadata refers primarily to post-production metadata.

Where the above-described imaging apparatus is in operation with recording mode in effect, the parameter setting device 132 selects the output correction parameters for securing a dynamic range and sets the selected parameters to the correction processing device 123 for gamma correction processing. What is output to the data recording device 125 are the output correction parameters that were used already and the simulation correction parameters desired to be used in post-production processing subsequent to imaging, or the metadata about these parameters including their ID. The image signal picked up by the image pickup device 121 and converted into digital form by the image signal processing device 122 is input to the correction processing device 123. The correction processing device 123 performs gamma correction on the input image signal based on the output correction parameters and also subjects the image signal to any other correction process that may be established concurrently, before outputting the corrected image signal to the compression processing device 124. The compression processing device 124 compresses the corrected image signal and outputs the compressed signal to the data recording device 125. The data recording device 125 records the compressed image signal and recording metadata to the image data recording media 201. In this manner, the picked-up image signal and recording metadata are written to the image data recording media 201.

In simulation mode, the parameter setting device 132 reads the simulation correction parameters from the parameter storage device 131 and sets the retrieved parameters to the correction processing device 123. If at this point there exist a plurality of sets of simulation correction parameters each carrying different settings, then the set of gamma correction parameters for simulation selected by the operation input device 135 is set to the correction processing device 123. If a parameter change instruction is given through the operation input device 135 upon simulation execution, then the simulation correction parameters are changed according to the instruction and the change is reflected in the settings on the correction processing device 123. In this case, the simulation correction parameters stored in the parameter storage device 131 may be updated either in response to the change instruction or when so instructed ultimately. The correction processing device 123 performs gamma correction on the image signal using the simulation correction parameters that have been set, and outputs the corrected image signal to both the display-ready signal conversion device 133 and the compression processing device 124. The display-ready signal conversion device 133 converts the corrected image signal into a display-ready signal that is output through the DVout terminal. The compression processing device 124 does nothing in particular at this point. A display device connected to the DVout terminal may give an image display based on the image signal corrected by the simulation correction parameters for simulation of post-production processing. The post-production metadata regarding the simulation correction parameters used at this point may be recorded to the metadata recording media 202 by the metadata recording device 134.

According to this embodiment, as described, modes are changed on a single imaging apparatus so as to effect a changeover between recording of the image signal corrected using the output correction parameters, and display of the image signal corrected by use of the simulation correction parameters. This makes it possible to verify the effects of post-production processing by simulating the eventual post-production process without recourse to cumbersome equipment, thereby determining in advance the gamma correction parameter values to be applied later. In recording mode, the image signal having undergone gamma correction using the ordinary output correction parameters is recorded to the image data recording media along with the simulation correction parameters or their ID determined in simulation mode. When an ID is to be recorded, the corresponding post-production metadata needs to be recorded to the metadata recording media as well.

From the image data recording media, post-production equipment acquires the image signal as well as the post-production metadata. The equipment proceeds to correct the image signal by use of the simulation correction parameters set in the post-production metadata.

What follows is a description of how gamma correction parameters are typically set.

Figure 4A:
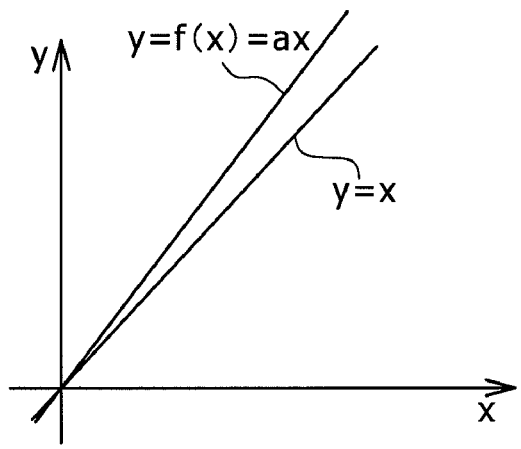
FIGS. 4A, 4B and 4C are graphic representations showing typical correction parameters for gamma curve adjustment.
Figure 4B:
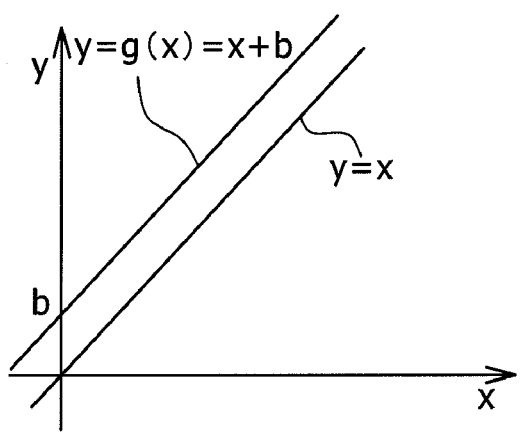
Figure 4C:
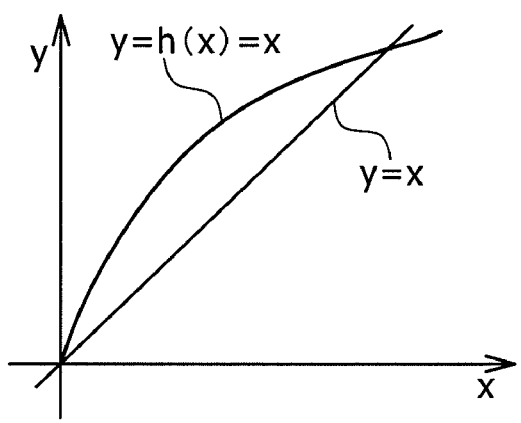

FIGS. 4A, 4B and 4C are graphic representations showing typical correction parameters for gamma curve adjustment. FIGS. 4A, 4B and 4C depict graphically a gain coefficient (GAIN), a lift coefficient (LIFT) and a power coefficient (POWER) respectively.

Described below is how correction processing is carried out when the gamma value is set for "1" on the original gamma curve. In this case, the gamma curve turns out to be linear so that the relationship between the input "x" and the output "y" may be expressed as y=x.

The gain coefficient (GAIN) in FIG. 4A is a parameter for changing the gradient of the gamma curve. If the gain coefficient is represented by "a," then the correction function f(x) for gamma curve correction is defined as $$y=f(x)=ax \qquad (1)$$

It is assumed that the parameter "a" may take any of the values ranging from −9.99 to 9.99.

The lift coefficient (LIFT) in FIG. 4B is a parameter for offsetting the gamma curve. If the lift coefficient is represented by "b," then the coefficient function g(x) for gamma curve correction is defined as $$y=g(x)=x+b \qquad (2)$$

It is assumed that the parameter "b" may take any of the values ranging from −9.99 to 9.99.

The power coefficient (POWER) in FIG. 4C is a parameter for correcting the gamma value. If the power coefficient is represented by "c," then the coefficient function h(x) for gamma curve correction is defined as $$y=h(x)=x^c \qquad (3)$$

It is assumed that the parameter "c" may take any of the values ranging from −9.99 to 9.99.

When the coefficients of the correction functions are set as the parameters as described above, it is possible to acquire a gamma curve that reproduces the desired expression in imagery. Furthermore, according to this embodiment, the correction functions may be processed in the order set as desired.

Figure 5A:
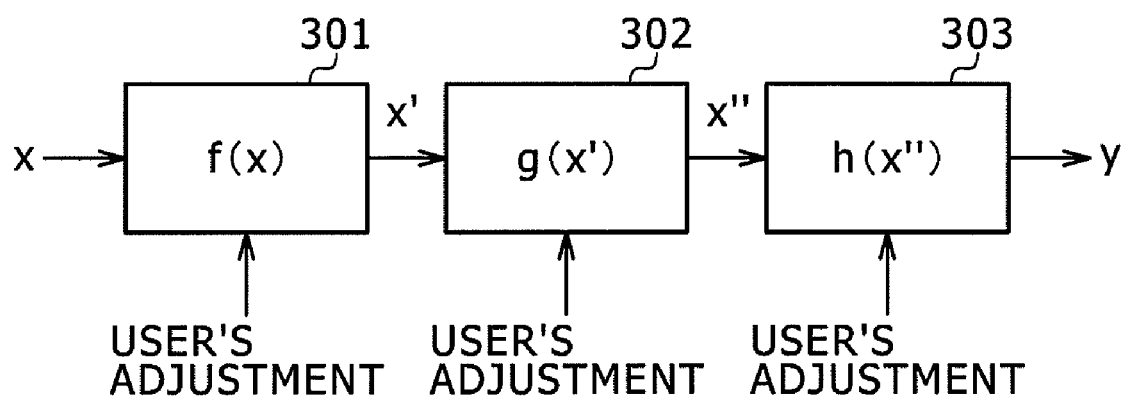
FIGS. 5A and 5B are schematic views comparing an ordinary correction process with the correction process of the embodiment.
Figure 5B:
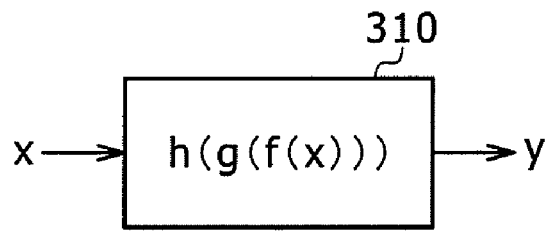

FIGS. 5A and 5B are schematic views comparing an ordinary correction process with the correction process of the embodiment. FIG. 5A indicates an ordinary gamma correction processing circuit structured by hardware. FIG. 5B depicts a gamma correction processing device of the embodiment implemented by software.

The gamma correction processing circuit in FIG. 5A is a typical hardware structure in which correction circuits are arranged in a fixed order. Specifically, the connection of circuitry is formed fixedly by an f(x) correction circuit 301, a g(x) correction circuit 302, and an h(x) correction circuit 303, in that order. It is assumed that the functions f(x), g(x) and h(x) are the same as those shown depicted in FIGS. 4A through 4C. In this setup, each of the coefficients of the correction functions may be adjusted as desired by the user. However, it is impossible to alter the order of the processing to be carried out: an input signal "x" is first processed by the correction function f(x) to give an output x', which is then processed by the correction function g(x) to yield an output x", which in turn is processed by the correction function h(x).

In the software structure of FIG. 5B, by contrast, correction functions may be composed by software and reflected in the gamma correction processing device. If it is desired to implement the same setup as that in (A) FIG. 5A, then the gamma correction processing device 310 is arranged to carry out its processing based on a correction function h(g(f(x))).

Where the correction function f(x) represented by the expression (1) above and the correction function g(x) denoted by the expression (2) are performed by the setup of FIG. 5A, the gamma curve is always defined as y=ax+b. With the setup of FIG. 5B, by contrast, having the correction functions f(x) and g(x) executed in that order allows the gamma curve to be corrected by y=ax+b. However, if the correction function g(x) is arranged to be followed by the correction function f(x) in their execution, then the gamma curve is corrected by y=a(x+b). If the correction function h(x) is added to the function combination, then more diverse forms of correction may be carried out. Obviously, the coefficients of the correction functions involved can be set as desired.

In order to implement the above-described gamma correction processing, this embodiment establishes, as post-production metadata about the simulation correction parameters, the parameter "a" for adjustment by the correction function f(x), the parameter "b" for adjustment by the correction function g(x), the parameter "c" for adjustment by the correction function h(x), and the order in which to process the correction functions f(x), g(x) and h(x).

In the actual imaging apparatus, gamma correction is carried out on each of the colors of red (R), green (G) and blue (B). The gamma curve may be corrected either as a whole or in part. The gamma correction processing of the above-described embodiment applies obviously to any one of the colors involved or to a particular range of the gamma curve.

The foregoing description has shown the correction processing carried out using the theoretical formula of gamma curves. Actual processing generally involves using line graphs approximating the theoretical formula or correction tables called look-up tables for correction purposes. This type of processing is well known. It is assumed for this embodiment that such line graphs or look-up tables are used in practice to perform the processing based on the theoretical formula calculated as discussed above, and the actual processing will not be discussed further.

Figure 6:
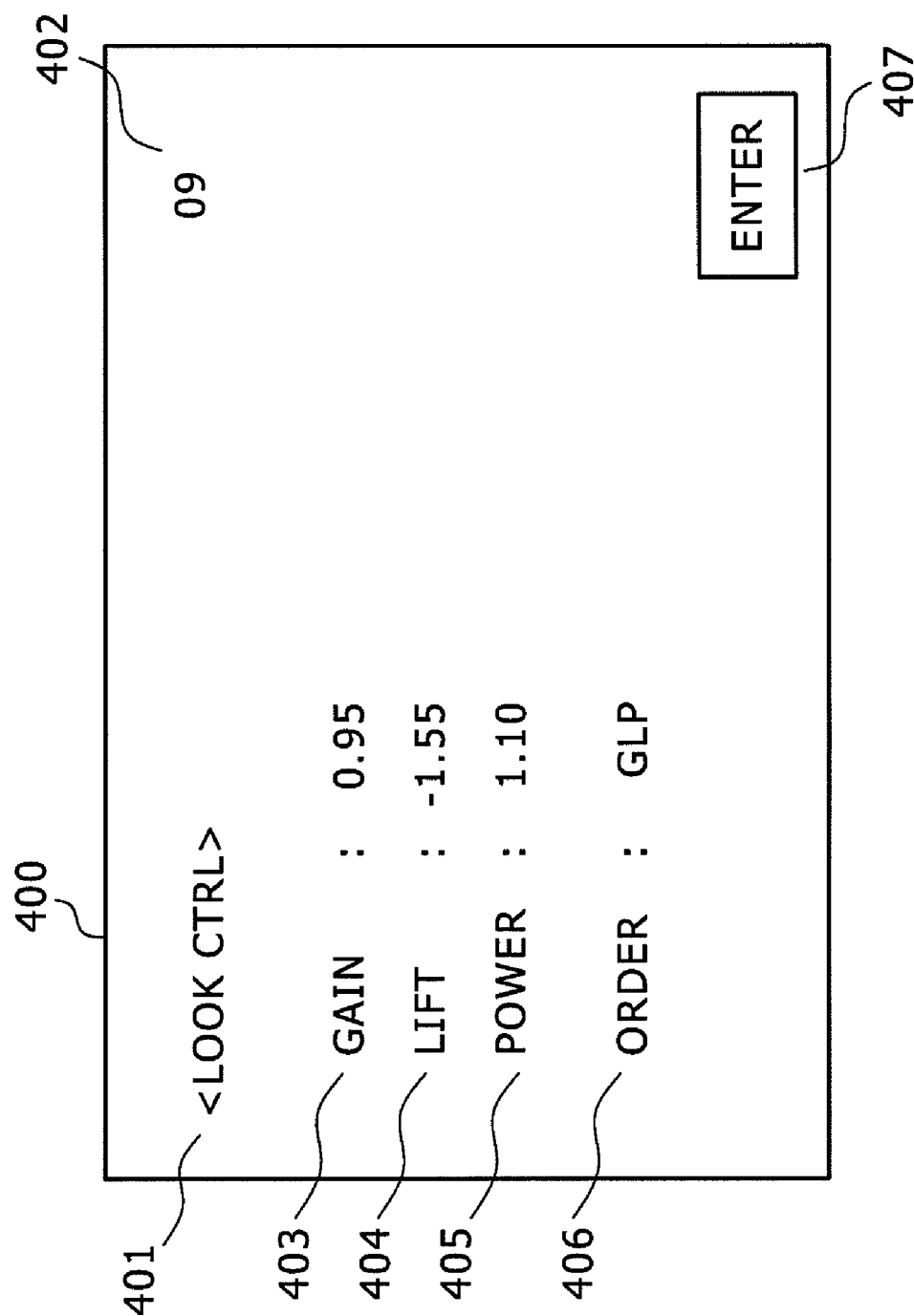
FIG. 6 is a schematic view showing a typical menu screen appearing on a display device.

What follows is a description of how the user may change the metadata about simulation correction parameters for adjustment. FIG. 6 is a schematic view showing a typical menu screen appearing on a display device.

When a metadata change instruction is input through the operation input device 135, the parameter setting device 132 instructs the display processing section 136 to display a menu screen 400 on the display device 106.

The menu screen displays a page title 401 along with a page number 402 and the current settings of the simulation correction parameters GAIN 403, LIFT 404, POWER 405, and ORDER 406.

The page title 401 constitutes information indicating the content of this page and may be entered as desired. The page number 402 is information which identifies the simulation correction parameters corresponding to the page. As such, the page number 402 constitutes an ID identifying the simulation correction parameters (post-production metadata). Alternatively, the ID may be represented by a product model number, a manufacturing number, a parameter creation time and date, or a globally unique UMID (Unique Material Identifier) stipulated by the SMPTE. Such ID representation makes it possible to use simultaneously image materials taken by a plurality of cameras in post-production processing. UMID's are stipulated under the SMPTE standard 330M. The imaging apparatus has the metadata about a plurality of sets of simulation correction parameters (GAIN, LIFT, POWER, ORDER) managed in advance in conjunction with a plurality of pages, each of the sets representing a different expression of imagery. The user may individually adjust and set each of the parameters or may select a given page carrying the parameters that will provide a desired kind of imagery expression. Obviously, the user may also set new pages.

The GAIN 403, LIFT 404, and POWER 405 are the parameters that determine the gain coefficient, lift coefficient, and power coefficient respectively. The values shown on each of the lines containing the parameters are the actual coefficients. These values may be updated according to instructions input through the operation input device 135. The ORDER 406 is an item that represents the order in which correction functions are to be carried out. This item is constituted by a string of characters each representing a correction function. In the example of FIG. 6, character G stands for the correction function f(x) for gain coefficient correction, character L denotes the correction function g(x) for lift coefficient correction, and character P represents the correction function h(x) for power coefficient correction. The character string GLP indicates that the functions f(x), g(x) and h(x) are executed in that order. As other alternatives, the character string GPL indicates that the functions f(x), h(x) and g(x) are carried out in that order, and the character string LGP shows that the functions g(x), f(x) and h(x) are performed in that order. Other orders of function execution may also be set in the manner described above.

The user may change the parameter values or the function execution order by operating the operation device 107. When an enter key 407 is operated by the user, the parameter setting device 132 writes the updated metadata to predetermined areas in the parameter storage device 131. The parameter storage device 131 retains areas corresponding to the pages. The parameter setting device 132 updates the simulation correction parameters in the area corresponding to the page number 402 (page 9 in the example of FIG. 6).

What follows is an explanation of metadata. FIGS. 7A and 7B show examples of metadata. FIG. 7A indicates typical metadata in the ASCII format, and FIG. 7B depicts typical metadata in the binary format.

In the ASCII format of FIG. 7A, the names of the parameter items displayed on the menu screen 400 and the parameter values that have been set are converted character by character into ASCII code (two-digit hexadecimal number). Illustratively, the item names "GAIN: (+)0.95, LIFT: −1.55 . . . " are converted into 47H(G), 41H(A), 49H(I), 4EH(N), 3AH(:), 2BH(+), 30H(0), 2EH(.), 39H(9), 35H(5), 44H(,), 4CH(L), etc. In this example, each value is separated from the next item by a comma (,).

In the ASCII format, the characters involved are each converted to ASCII code so that they may be easily changed as needed later. In particular, the transfer of data to the post-production equipment, which is a separate apparatus, is effected conveniently because there is no need to report the structure of the metadata to the equipment. One disadvantage of this arrangement is a growing amount of data: the items GAIN and LIFT are each composed of 10 characters, while the item POWER is constituted by 11 characters, the item ORDER by 9 characters, and the comma by 3 characters. The number of these characters is doubled when the items are converted to the ASCII code.

In the binary format of FIG. 7B, the items displayed on the menu screen 400 are arranged to correspond with specific byte areas. For example, the item GAIN has its parameter value stored in bytes 0 through 3. Likewise, the item LIFT has its parameter value stored in bytes 4 through 7. The order of the functions set by the item ORDER is given as one of six combinations of G, L and P, each combination being identified using an ID defined by one of numbers 0 through 5 and stored in byte C.

In the binary format, it is possible to express the information on the menu screen 400 using just 13 bytes ranging from byte 0 through byte C. This arrangement makes it possible to reduce the size of metadata but poses difficulties in changing the order of the items or making other modifications flexibly.

The metadata described in the formats described above is recorded to the metadata recording media 202 or image data recording media 201 for transfer to the post-production equipment or the like. If the destination equipment already holds the same kinds of metadata, there is no need to transfer the entire metadata; only the ID's identifying the post-production metadata need to be transferred.

Illustratively, suppose that the image data recording media 201 hold the compressed image signal as well as an ID of the output correction parameters and post-production metadata as the recording metadata. Suppose also that the post-production equipment already has the values of the simulation correction parameters set typically via the metadata recording media 202, the parameter values being identified by metadata ID's. In such a case, the post-production equipment reads the metadata ID from the image data recording media 201, compares the retrieved ID with the ID's being held internally, and selects the matching ID to identify the metadata of interest. This makes it possible for the post-production equipment to process the image signal using the gamma correction parameters designated by the imaging apparatus. If post-production metadata was directly recorded to the image data recording media 201 as the recording metadata, then the recorded metadata will be used in post-production processing.

Where the above-described imaging apparatus is in use at an imaging site, the user may designate simulation of the picked-up image signal for post-production processing. In this case, the parameter setting device 132 switches to the simulation correction parameters used as the gamma correction parameters by the correction processing device 123. The image signal processed by the correction processing device 123 using the simulation correction parameters is converted into a display-ready signal by the display-ready signal conversion device 133 for display on the display device. The user verifies the image being displayed on the display device, and adjusts as needed the simulation correction parameters by operating the operation input device 135. When desired imagery is obtained, the user finalizes the simulation correction parameters. The post-production metadata about the simulation correction parameters thus determined, along with a corresponding metadata ID, is stored into the parameter storage device 131. The post-production metadata may be recorded to the metadata recording media 202 by the metadata recording device 134 when so requested. After the simulation, the parameter setting device 132 switches to the output correction parameters for use as the gamma correction parameters. The writing of metadata to the metadata recording media 202 is to be carried out with or without simulation mode being in effect.

In recording mode, the picked-up image signal is corrected by use of the output correction parameters before being compressed and recorded to the image data recording media 201. In addition to the image signal, the corresponding recording metadata (utilized output correction parameters), post-production metadata about the designated simulation correction parameters, or the ID of the post-production metadata is recorded concurrently to the image data recording media 201.

The post-production equipment interprets the post-production metadata written on the image data recording media 201 and, using the reproduced gamma correction parameters, performs gamma correction on the image signal recorded on the image data recording media 201. If solely the ID of the metadata is found recorded on the image data recording media 201, then the corresponding metadata is retrieved from the metadata recording media 202 and the same processing is carried out. If the metadata with the same ID is found to exist in the equipment, that metadata may be utilized instead.

According to the embodiment of the invention, as described above, post-production processing can be simulated easily in the field where imaging is taking place. The result of the simulation may also be used in the processing by production equipment.

What follows is a description of how the image signal is processed by this embodiment in each of two modes: simulation mode, and recording mode.

Figure 8:
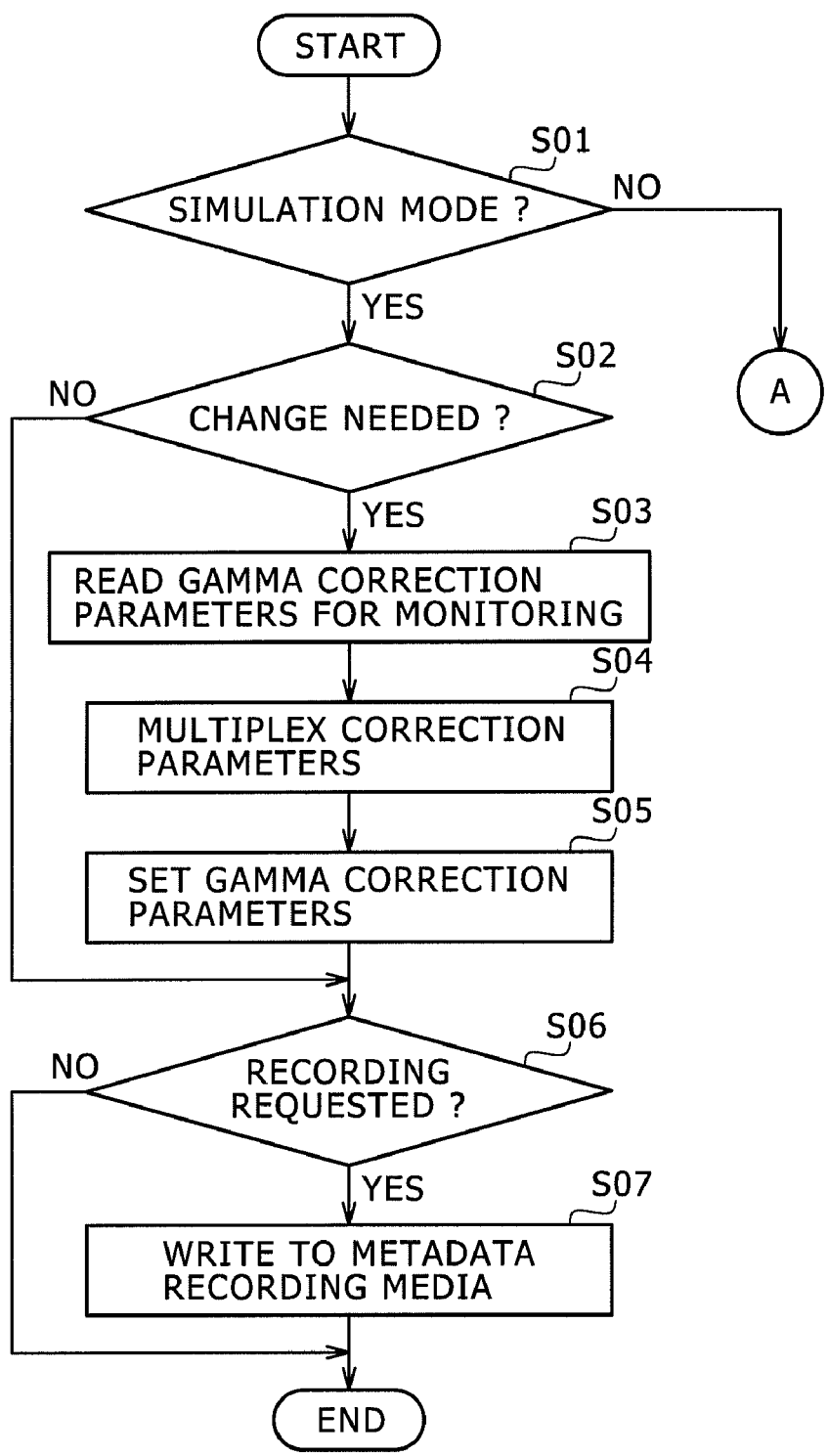
FIG. 8 is a flowchart of steps for processing the image signal in simulation mode.

FIG. 8 is a flowchart of steps for processing the image signal in simulation mode.

[Step S01] A check is made to determine whether simulation mode is in effect. If simulation mode is found to be in effect, then step S02 is reached. If recording mode is found to be set, then control is passed on to the process A shown in FIG. 9.

[Step S02] A check is made to determine whether a change of the gamma correction parameters to be set on the correction processing device 123 is necessary. If the current process is the first to be performed since simulation mode was selected, then the change is deemed necessary. When the change is found to be needed, then control is passed on to step S03; if the change is not found to be necessary, then control is transferred to step S06.

[Step S03] The simulation correction parameters are read from the parameter storage device 131. If a plurality of sets of simulation correction parameters are stored, either the designated parameter set or the most recently used set of the parameters is retrieved.

[Step S04] The currently set output correction parameters are multiplexed with the simulation correction parameters retrieved in step S03, whereby the gamma correction parameters are calculated.

[Step S05] The gamma correction parameters calculated in step S04 are set to the correction processing device 123. Thereafter, using the gamma correction parameters thus established, the correction processing device 123 performs gamma correction on the image signal input from the image signal processing device 122.

[Step S06] A check is made to determine whether there is a request to record metadata to the metadata recording media 202. If there is no such request, then the current processing is terminated. If such a request is found to exist, then control is transferred to step S07.

[Step S07] In response to the request for metadata recording, the requested post-production metadata is written to the metadata recording media 202. Alternatively, all post-production metadata stored in the parameter storage device 131 may be written to the metadata recording media 202.

When the above steps are carried out in simulation mode, the simulation correction parameters are selected for use by the correction processing device 123 as the gamma correction parameters. The image signal is then corrected by use of the simulation correction parameters before being converted by the display-ready signal conversion device 133 into a display-ready signal that is output to the display device. By viewing what is displayed on the display device, the user can simulate post-production processing of the image signal at the site where it has been picked up.

Figure 9:
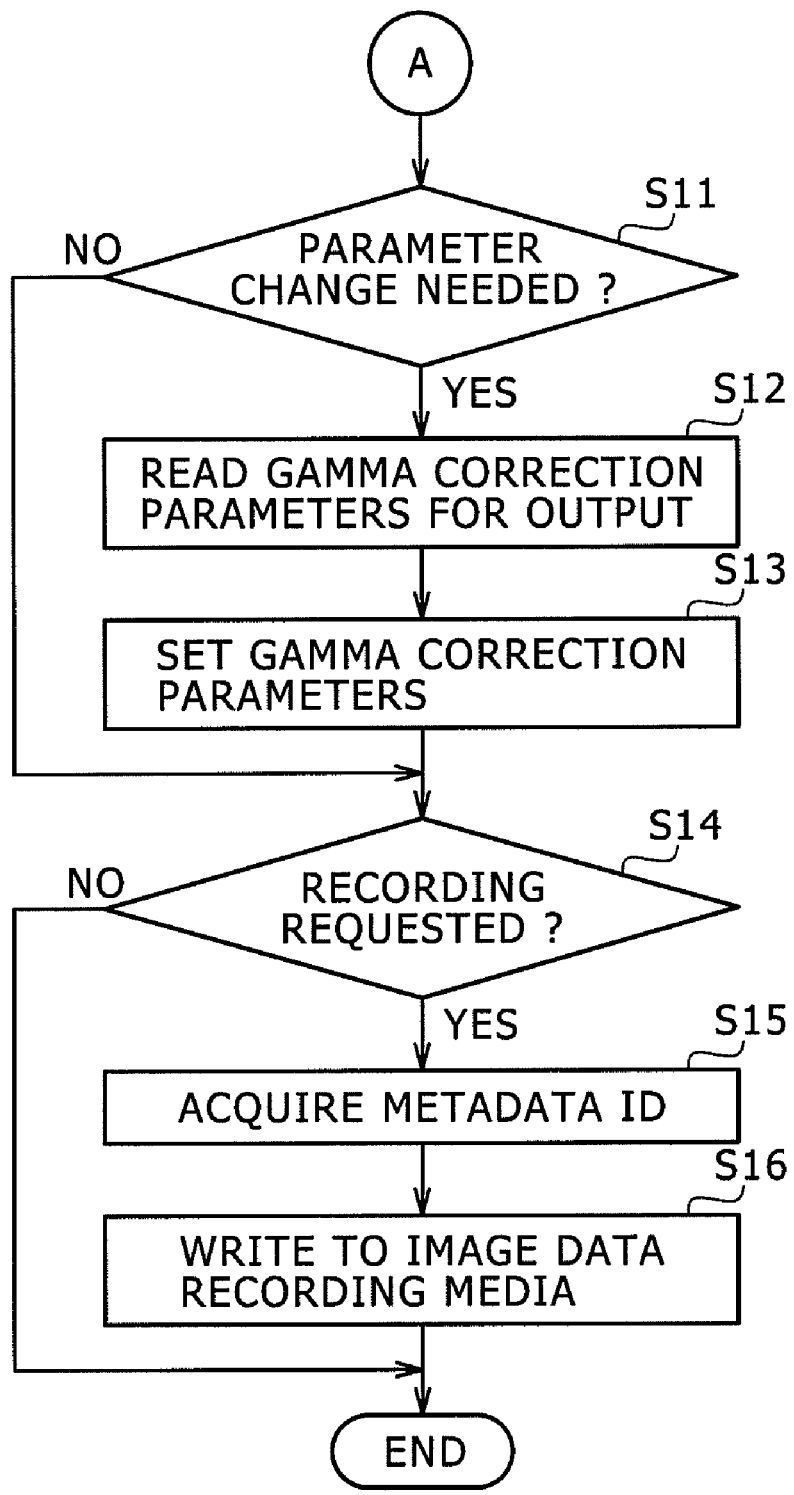
FIG. 9 is a flowchart of steps for processing the image signal in recording mode.

FIG. 9 is a flowchart of steps for processing the image signal in recording mode. When recording mode is in effect, the following steps are carried out:

[Step S11] A check is made to determine whether a change of the gamma correction parameters to be set on the correction processing device 123 is necessary. If the current process is the first to be performed since recording mode was set to replace simulation mode, then the change is deemed necessary. When the change is found to be needed, then control is passed on to step S12; if the change is not found to be necessary, then control is transferred to step S14.

[Step S12] With the parameter change deemed necessary, the output correction parameters are read from the parameter storage device 131. If a plurality of sets of output correction parameters are stored, either the designated parameter set or the most recently used set of the parameters is retrieved.

[Step S14] A check is made to determine whether there is a request to record data to the image data recording media. If there is no such request, then the current processing is terminated. If such a request is found to exist, then control is transferred to step S15.

[Step S15] An ID identifying the corresponding post-production metadata is acquired.

[Step S16] The compressed image signal is recorded to the image data recording metadata together with the metadata constituted by the output correction parameters used to correct the image signal and by the ID of the post-production metadata associated with the image signal. Alternatively, the post-production metadata may be recorded directly as the metadata.

When the steps above are carried out, the picked-up image signal having undergone gamma correction based on the output correction parameters used in normal recording is recorded to the image data recording media 201 along with the post-production metadata or its ID to be referenced in subsequent post-production processing. In the post-production process following the imaging process, the post-production metadata or its ID recorded on the image data recording media 201 is referenced so that the image signal of interest will be subjected to post-production processing.

The functions of the above-described processing may be implemented using a computer. In this case, the computer may be furnished with programs that describe the details of the functions to be realized by the imaging apparatus. Having the computer carry out these programs allows the computer to implement the processing functions discussed above. The programs describing the processing details may be recorded on computer-readable recording media such as magnetic recording devices, optical disks, magneto-optical recording media, and semiconductor memories. The magnetic recording devices include hard disk drives (HDD), flexible disk (FD) drives, and magnetic tape drives. The optical disks include DVD (Digital Versatile Disc), DVD-RAM, CD-ROM (Compact Disc Read Only Memory), and CD-R (Readable)/RW (Rewritable). The magneto-optical recording media include MO (Magneto-Optical disk).

The programs may be distributed illustratively by marketing portable recording media such as DVD and CD-ROM on which the programs are recorded. Alternatively, the programs may be stored in the storage device of a server computer. The programs may then be transferred from the server computer to other computers that will execute the received programs.

The computer for program execution stores into its own storage device the programs that are illustratively retrieved from portable recording media or transferred from the server computer. The computer proceeds to read the programs from its storage device and perform the processes according to the retrieved programs. Alternatively, the computer may directly read the programs from the portable recording media for execution of the processes based on the retrieved programs. As another alternative, the computer may carry out a process every time the program corresponding to that process is received from the server computer.

It should be understood by those skilled in the art that various modifications, combinations, sub-combinations and alterations may occur depending on design requirements and other factor in so far as they are within the scope of the appended claims or the equivalents thereof.

What is claimed is:

1. An imaging apparatus for performing predetermined image signal processing on an image signal picked up by an image pickup device in order to convert the image signal for recording and display purposes, said imaging apparatus comprising:
   a parameter storage section configured to store output correction parameters used to correct an image signal's dynamic range and output the picked-up image signal to the outside, and simulation correction parameters used in a simulation mode to correct image toning of a simulated post-production processed version of said image signal, wherein post-production processing comprises editing picked up image signals;
   a parameter setting section configured to select said simulation correction parameters if said simulation mode is set, and to select said output correction parameters if said simulation mode is canceled, the selected parameters being retrieved from said parameter storage section, said parameter setting section further changing the parameters for gamma correction between said simulation mode and a non-simulation mode;
   a gamma correction processing section configured to perform gamma correction processing on an image signal input thereto based on either said output correction parameters or said simulation correction parameters selected by said parameter setting section;
   a display-ready signal conversion section configured to convert into a display-ready signal said image signal having undergone the gamma correction based on said simulation correction parameters when said simulation mode is set, thereby providing a simulated gamma-corrected post-production processed image signal ready for post-production processing; and
   a metadata storage section configured to store as metadata the simulation correction parameters used for gamma correction processing on the image signal input thereto for subsequent use of said metadata in post-production processing of the image signal picked up by said image pickup device.

2. The imaging apparatus according to claim 1, wherein said metadata storage section includes a metadata recording section configured such that together with identification information for identifying said simulation correction parameters, said metadata recording section either records said simulation correction parameters to metadata recording media from which the recorded parameters may be read by another apparatus, or outputs said simulation correction parameters to the outside.

3. The imaging apparatus according to claim 1, further comprising:
   an image data recording section configured such that if said simulation mode is canceled and if said image signal having undergone said gamma correction based on said output correction parameters is to be either recorded to image recording media from which said image signal may be read by another apparatus or output to the outside, then said image data recording section attaches to said image signal said simulation correction parameters selected for said image signal.

4. An imaging apparatus for performing predetermined image signal processing on an image signal picked up by an image pickup device in order to convert the image signal for recording and display purposes, said imaging apparatus comprising:
   a parameter storage section configured to store output correction parameters used to output the picked-up image signal to the outside, and simulation correction parameters used in simulation mode subsequent to imaging;
   a parameter setting section configured to select said simulation correction parameters if said simulation mode is set based on an externally designated input, and to select said output correction parameters if said simulation mode is canceled, the selected parameters being retrieved from said parameter storage section, said parameter setting section further changing the parameters for gamma correction between said simulation mode and non-simulation mode;
   a gamma correction processing section configured to perform gamma correction processing on the input image signal based on either said output correction parameters or said simulation correction parameters set by said parameter setting section; and
   a display-ready signal conversion section configured to convert into a display-ready signal said image signal having undergone the gamma correction based on said simulation correction parameters when said simulation mode is set;
   wherein said simulation correction parameters are associated with identification information for identifying said simulation correction parameters; and
   wherein said image data recording section attaches to said image signal said identification information for identifying said simulation correction parameters in place of said simulation correction parameters.

5. An imaging apparatus for performing predetermined image signal processing on an image signal picked up by an image pickup device in order to convert the image signal for recording and display purposes, said imaging apparatus comprising:

a parameter storage section configured to store output correction parameters used to output the picked-up image signal to the outside, and simulation correction parameters used in simulation mode subsequent to imaging;

a parameter setting section configured to select said simulation correction parameters if said simulation mode is set based on an externally designated input, and to select said output correction parameters if said simulation mode is canceled, the selected parameters being retrieved from said parameter storage section, said parameter setting section further changing the parameters for gamma correction between said simulation mode and non-simulation mode;

a gamma correction processing section configured to perform gamma correction processing on the input image signal based on either said output correction parameters or said simulation correction parameters set by said parameter setting section; and a display-ready signal conversion section configured to convert into a display-ready signal said image signal having undergone the gamma correction based on said simulation correction parameters when said simulation mode is set;

wherein said simulation correction parameters include coefficients of a plurality of correction functions for changing characteristics of a gamma curve used by said gamma correction processing section, as well as an order in which to perform operations using said plurality of correction functions; and wherein said gamma correction processing section composes said plurality of correction functions defined by said simulation correction parameters and carries out gamma correction processing based on the composed correction functions.

6. An imaging method for performing predetermined image signal processing on an image signal picked up by an image pickup device in order to convert the image signal for recording and display purposes, said imaging method comprising the steps of:

storing into a parameter storage section output correction parameters used to correct an image signal's dynamic range and output the picked-up image signal to the outside, and simulation correction parameters used in a simulation mode to correct image toning of a simulated post-production processed version of said image signal, wherein post-production processing comprises editing picked up image signals;

selecting said simulation correction parameters if said simulation mode is set or said output correction parameters if said simulation mode is canceled, the selected parameters being read from said parameter storage section;

changing the parameters for gamma correction between said simulation mode and a non-simulation mode;

performing gamma correction processing on an input image signal based on either said selected output correction parameters or said selected simulation correction parameters;

converting into a display-ready signal said image signal having undergone the gamma correction based on said simulation correction parameters when said simulation mode is set, thereby providing a simulated gamma-corrected post-production processed image signal ready for post-production processing; and storing as metadata the simulation correction parameters used for gamma correction processing on the image signal input thereto for subsequent use of said metadata in post-production processing of the image signal picked up by said image pickup device.

7. A computer-readable storage medium storing an image signal processing program for causing a computer to perform predetermined image signal processing on an image signal picked up by an image pickup device for correction purposes, said image signal processing program comprising the steps of:

storing into a parameter storage section output correction parameters used to correct an image signal's dynamic range and output the picked-up image signal to the outside, and simulation correction parameters used in a simulation mode to correct image toning of a simulated post-production processed version of said image signal, wherein post-production processing comprises editing picked up image signals;

selecting said simulation correction parameters if said simulation mode is set or said output correction parameters if said simulation mode is canceled, the selected parameters being retrieved from said parameter storage section;

changing the parameters for gamma correction between said simulation mode and non-simulation mode;

performing gamma correction processing on an input image signal based on either said selected output correction parameters or said selected simulation correction parameters;

converting into a display-ready signal said image signal having undergone the gamma correction based on said simulation correction parameters when said simulation mode is set, thereby providing a simulated gamma-corrected post-production processed image signal ready for post-production processing; and storing as metadata the simulation correction parameters used for gamma correction processing on the image signal input thereto for subsequent use of said metadata in post-production processing of the image signal picked up by said image pickup device.

8. An imaging apparatus for performing predetermined image signal processing on an image signal picked up by an image pickup device in order to convert the image signal for recording and display purposes, said imaging apparatus comprising:

parameter storage means for storing output correction parameters used to correct an image signal's dynamic range and output the picked-up image signal to the outside, and simulation correction parameters used in a simulation mode to correct image toning of a simulated post-production processed version of said image signal, wherein post-production processing comprises editing picked up image signals;

parameter setting means for selecting said simulation correction parameters if said simulation mode is set, and to select said output correction parameters if said simulation mode is canceled, the selected parameters being retrieved from said parameter storage means, said parameter setting means further changing the parameters for gamma correction between said simulation mode and a non-simulation mode;

gamma correction processing means for performing gamma correction processing on an image signal input thereto based on either said output correction parameters or said simulation correction parameters selected by said parameter setting means;

display-ready signal conversion means for converting into a display-ready signal said image signal having undergone the gamma correction based on said simulation correction parameters when said simulation mode is set, thereby providing a simulated gamma-corrected post-production processed image signal ready for post-production processing; and metadata storage means for storing as metadata the simulation correction parameters used for gamma correction processing on the image signal input thereto for subsequent use of said metadata in post-production processing of the image signal picked up by said image pickup device.

* * * * *